M. H. BENNETT.
PROCESS OF MELTING AND MELTING AND REDUCING METALS.
APPLICATION FILED FEB. 9, 1920.

1,337,305.

Patented Apr. 20, 1920.

INVENTOR:
Morris H. Bennett
BY
Philipp, Sawyer, Rice & Kennedy
ATTORNEYS

UNITED STATES PATENT OFFICE.

MORRIS H. BENNETT, OF WATERBURY, CONNECTICUT, ASSIGNOR TO SCOVILL MANUFACTURING COMPANY, OF WATERBURY, CONNECTICUT, A CORPORATION OF CONNECTICUT.

PROCESS OF MELTING AND MELTING AND REDUCING METALS.

1,337,305.      Specification of Letters Patent.      Patented Apr. 20, 1920.

Substitute for application Serial No. 241,941, filed June 26, 1918. This application filed February 9, 1920. Serial No. 357,212.

*To all whom it may concern:*

Be it known that I, MORRIS H. BENNETT, a citizen of the United States, residing at Waterbury, county of New Haven, and State of Connecticut, have invented certain new and useful Improvements in Processes of Melting and Melting and Reducing Metals, fully described and represented in the following specification and the accompanying drawings, forming a part of the same.

This invention relates to a process of melting and melting and reducing metals of high thermal conductivity. Most metals of the non-ferrous group are characterized by high thermal conductivity, but the heat treatment employed has, generally speaking, been closely analogous to or has followed that employed in melting metals of the ferrous group, the thermal conductivity of which is low. Copper, for instance, when melted on a large scale, is melted in reverberatory furnaces and the crucible practice employed in melting brass closely follows the crucible practice employed in melting steel. Following the analogy of the practice used in melting ferrous metals, therefore, in commercially melting non-ferrous metals the melting heat has been applied without any special consideration of the high thermal conductivity of these non-ferrous metals, no attempt having been made to utilize this characteristic of high thermal conductivity in the melting operations. The result has been that, in melting these non-ferrous metals, they are liable to be and frequently are overheated, so that fumes and gases are given off. Large losses result, because these fumes and gases, which must be carried off in stacks or otherwise disposed of, are heavily charged with valuable metallic constituents. This is particularly true where alloys are being melted, in which these non-ferrous metals largely predominate. In melting brass, for instance, large zinc losses occur because of the manner of applying the heat. The losses which occur in melting alloys are serious, not only from the point of view of the waste of material, but also because of the disturbance of the proportions of the constituent metals. The losses of some of these constituent metals exceed those of others, and it is not possible to determine in advance what loss will occur in melting any given charge. The result is varying metal which may cause serious losses in the subsequent manufacturing processes.

Further, the commercial melting of brass and copper, for instance, has heretofore been confined to crucibles except where the copper is melted on a very large scale in the reverberatory furnace, and, where the reverberatory furnace is employed, additional metallurgical operations are necessary to eliminate the contamination which the copper suffers in these furnaces. As crucibles are necessarily limited in size the charges melted are small, a charge of a thousand pounds being considered large in crucible practice.

Generally speaking, this invention has for its principal object the melting, and melting and reducing, of metals of the non-ferrous group in such a way as to reduce the overheating by utilizing the characteristic of high thermal conductivity, thereby avoiding the production of fumes and the waste of metal and the disturbance of the proportions of the mixture in the case of melting alloys; the process also enabling the melting to be carried on on a large scale.

The invention has other objects in view which will appear from the following description of the invention.

In carrying the invention into effect, the metal to be treated is charged into a furnace and the heat is delivered thereto over an area, or preferably over a plurality of areas, these heat receiving areas being less, and preferably very considerably less, than the area of the charge. The delivery of heat to the area or areas is so regulated and controlled that the rate of delivery or transmission of heat to the metal does not exceed the heat required for fusing the metal in the areas by an amount which is more than can be conducted away therefrom through the charge, the high thermal conductivity of the metal being taken into account. In other words, the delivery of the heat to the areas is so controlled that the excess of heat beyond that required for fusing the metal of the areas is no more than can be conducted away from the areas by utilizing the high thermal conductivity of the metal. The result of this regulation of the heat is that, although the metal is fused in the heated areas and these areas continue to receive heat after fusing, the heat, in excess of what may be termed the fusing heat, is rapidly conducted away from these heated areas through the charge, so that, during that part of the operation which may be regarded as fusing, the metal in the heated areas does not become so hot as, practically speaking, to give off fumes. As the fusing proceeds, the highly heated areas gradually increase in size, with the result that the entire charge is fused uniformly and the fusing is accomplished without producing excessive temperatures in any part of the charge. There is, therefore, during fusing, no undue or excessive heating of the metal and no undue or excessive production of fumes.

Of course, rapidity of operation is of great importance from a commercial point of view, and it will be understood, therefore, that the heat energy will be delivered to the charge as rapidly and in such amounts as is consistent with the avoidance of overheating in the heat receiving areas.

Electrical energy will preferably be employed in carrying the invention into effect, as heat energy so derived is economical and the electrical energy lends itself readily to control and regulation by which overheating in the heat receiving areas is avoided.

In practising the invention by what are regarded as the best methods, the electrical energy will be utilized by employing a furnace in which a plurality of electrodes is used to deliver the heat energy to the charge.

The current employed should be of high amperage but to avoid too high a power input, the voltage must be low. The amperage and voltage will both vary according to the size of the furnace. While it is not possible to give exact figures, it has been found, in furnaces varying in capacity from one to five tons, that the amperage employed should range from about 2,500 to 4,200 amperes, 2,500 having been found efficient for the one-ton, and 4,200 for the five-ton furnace. For the one-ton furnace, satisfactory results are obtained by employing a potential of about 18 to 20 volts, but with the five-ton furnace, a voltage of from 32 to 40 volts may be safely employed, the voltage being measured from electrode to charge.

The regulation of the current and the consequent heat energy is effected through proper resistance. This can be efficiently done by establishing and maintaining a proper resistance zone between the end of the electrodes and the charge, that is, by properly spacing the end of the electrode from the charge. Under proper conditions of voltage and amperage, the maintenance of a proper zone of resistance will result in the delivery of the proper amount of heat energy to the metal. It will be understood that proper instruments will be employed in connection with the furnace to detect changes in amperage or voltage which may occur during operation and proper means will be employed to correct undue variations.

As has been pointed out, the process enables the fusing of the metal to be effected without undue production of fumes, gases or vapors. In practice, however, the metal, after being fused, requires to be raised in temperature so that it may be subsequently effectively handled. In other words, in ordinary commercial practice, the metal, after being fused and before being poured from the furnace, is superheated, i. e., is raised in temperature to what may be termed the pouring temperature. During this period of superheating, fumes will be given off to some extent though not excessively. As, however, these fumes contain valuable metallic constituents, an important feature of the invention relates to the saving of these metallic constituents by condensing them out of the fumes and returning them to the charge. This condensing of the fumes may be variously carried out, but as no substantial or undue amount of fumes are produced during the fusing period, the process is well adapted to be carried out in a furnace, the chamber of which is so closed as to avoid any substantial escape of the fumes. The heat introduced into the furnace during the fusing period is substantially all absorbed or utilized in fusing the metal, so that the walls and roof of the chamber will not be substantially heated by radiation. They are, therefore, relatively cool, and can act to condense the metallic constituents of the fumes. As has been said, there is no undue production of fumes during the fusing period and while some production of fumes occurs during the superheating, the resulting pressures in the furnace due to these fumes do not become sufficiently great during this superheating period to interfere with the proper working of the furnace.

Where a furnace such as has been referred to, i. e., a furnace having a closed chamber is employed, it is highly desirable to maintain a reducing atmosphere in the furnace, as the condensation and reduction of the metallic constituents of the fumes is greatly aided thereby. While this may be variously accomplished, it may be effectively done by employing electrodes of carbonaceous material, such, for instance, as carbon or graphite. The oxygen in the furnace and that released from the metals during the heating combine with the carbon of the electrodes and form a CO atmosphere in the furnace chamber, this being highly favorable for the reducing operation.

It may be remarked that in the practice of the process, the temperature of the furnace walls is a controllable factor. For instance, with a given heat input, the temperatures of the walls may be raised or lowered by varying the design of the walls, so as to increase or diminish the heat radiated therefrom into the surrounding atmosphere. Of course, the greater the heat radiated from the walls into the surrounding atmosphere the cooler the walls will be and vice versa. Again, the temperature of the walls can be controlled by changes in the voltage. With a given design of wall, an increase in the voltage increases the amount of heat delivered to the walls, and, therefore, increases the temperature of the walls. The control of the temperature of the walls is of importance, especially in the melting of alloys which contain zinc. Where such alloys are being melted, care should be taken not to allow the temperature of the walls to become too low, because if the walls be too cool, the zinc vapors will condense in the form of blue powder and not as metallic zinc.

Where alloys are being melted, it is highly desirable to induce circulation of the fused metal in the furnace chamber. The improved process contemplates the production of such circulation. To effect this the electrodes are so set and the current employed is of such a character as to set up a rotating magnetic field in the metal. While this may be variously accomplished, it has been found effective to do this by using a multiphase current and a proper number of electrodes, as, for instance, a three-phase alternating current and three properly spaced electrodes.

While the practice of the invention is not confined to any specific furnace, the accompanying drawings illustrate diagrammatically an electric furnace which is well-adapted to the practice of the invention.

In these drawings—

Figure 1:
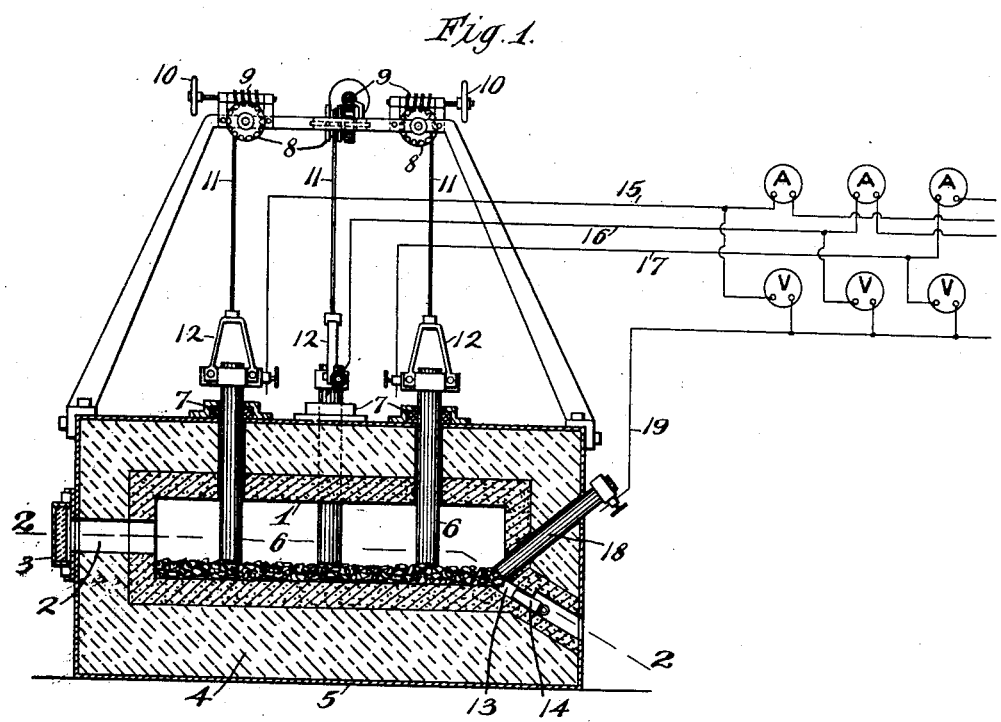
Figure 1 represents a furnace in vertical cross-section.
Figure 2:
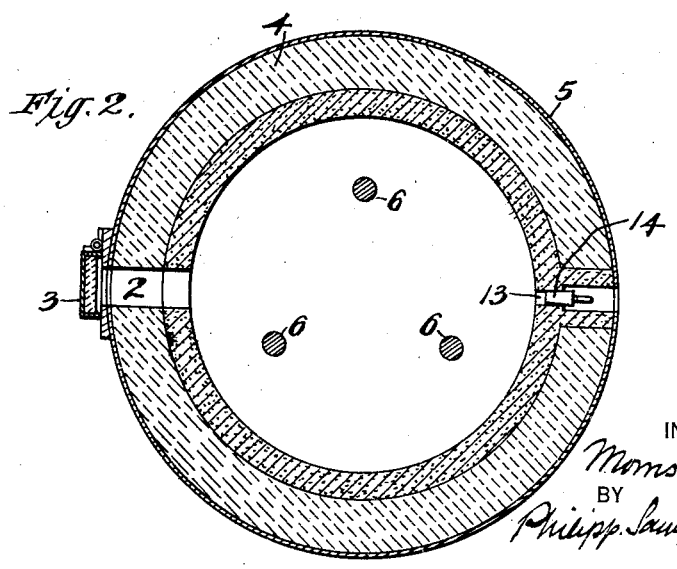
Fig. 2 represents a sectional plan on the line 2—2 of Fig. 1.

The furnace lining is indicated at 1, this being the usual tamped lining which may be of carborundum, asbestos, cement, or the like. The charging opening of the furnace is indicated at 2. This opening is closed by a door 3. This door should close in such a way as to prevent any substantial escape of fumes. If desired, the door joint may be packed with asbestos, or with any other suitable material, but this as a rule will not be necessary, for such metallic vapors as are given off will condense around the joint of the door and make it sufficiently tight. The furnace lining is surrounded by the usual fire brick 4 which may be contained within a metal shell 5. The furnace illustrated is intended to be used with a three-phase current and three electrodes are shown at 6. To favor the induced circulation of the fused metal hereinabove referred to, where three electrodes are employed, it is desirable that these electrodes be equally spaced. As the furnace illustrated is a circular furnace, these electrodes are shown as 120° apart. The electrodes extend through suitable apertures in the furnace lining, brick and shell, and, if desired, suitable stuffing boxes, as 7, may be used to prevent the entry of air into the furnace or the egress of gases therefrom. These stuffing boxes will also permit the electrodes to be moved to maintain the proper distance between their delivery ends and the charge, and, consequently maintain the proper heat delivery to the charge as the charge melts. The movement of the electrodes may be effected in any suitable way. As shown, three worm drums 8 are provided, these drums being operated by worms 9 turned by hand wheels 10. The worm drums are connected by cables 11 to yoke 12 secured to the tops of the electrodes. Where the furnace is a stationary furnace, a tapping orifice, as 13, will be employed, this orifice being closed by a plug 14. The electrodes are in circuit with a suitable source of electric energy, as a three-phase transformer, the circuit wires being indicated at 15, 16 and 17. Each circuit is provided with suitable indicating instruments to show the amount of current flowing, these, as shown, being ammeters located in the circuits. Suitable indicating devices are also employed to indicate the voltage between each electrode and the charge. As shown, these consist of voltmeters connected on the circuits, the return being through a suitable connection 18 and wire 19, the connection 18 being in contact with the charge. By manipulating the hand wheels and thus raising or lowering the electrodes, the delivery of heat energy to the charge may be regulated and controlled in such a way that each electrode will always deliver the proper amount of heat energy to the charge.

What is claimed is:

1. The process of melting in a furnace non-ferrous metals of high thermal conductivity consisting in delivering heat to the charge over areas relatively small with respect to the charge and so controlling the rate of heat delivery that during fusing the heat will be conducted away through the charge before the areas can be sufficiently raised in temperature to cause undue production of fumes.

2. The process of melting in a furnace metals of high thermal conductivity consisting in delivering electrical energy to the charge over an area or areas relatively small with respect to the charge and so controlling the rate of delivery of the energy that during fusing the heat developed will be conducted from the area or areas away through the charge before the metal can be sufficiently raised in temperature to cause undue production of fumes.

3. The process of melting in a furnace metals of high thermal conductivity consisting in delivering heat to the charge, so controlling the rate of heat delivery that during the fusing the heat will be conducted through the charge and the entire charge fused before any part thereof is sufficiently raised in temperature to cause undue production of fumes, continuing the delivery of the heat after the charge is fused to raise it to a pouring temperature, and condensing the fumes given off and returning the metallic constituents to the charge.

4. The process of melting in a furnace metals of high thermal conductivity consisting in delivering electrical energy to the charge, so controlling the rate of delivery of the energy that during fusing the heat developed will be conducted through the charge and the entire charge fused before any part thereof is sufficiently raised in temperature to cause undue production of fumes, continuing the delivery of energy after the charge is fused to raise it to a pouring temperature, and condensing the fumes given off and returning the metallic constituents of the charge.

5. The process of melting in an electric furnace employing an electrode or electrodes metals of high thermal conductivity, consisting in delivering the electrical energy to the charge across a zone of resistance between electrode and charge, and so controlling the rate of delivery of the energy that during fusing the heat developed at or near the electrode or electrodes will be conducted away through the charge before the temperature is sufficiently raised to cause undue production of fumes.

6. The process of melting in an electric furnace employing an electrode or electrodes metals of high thermal conductivity, consisting in delivering the electrical energy to the charge across a zone of resistance between electrode and charge, so controlling the rate of delivery of the energy that during fusing the heat developed at or near the electrode or electrodes will be conducted away through the charge before the temperature is sufficiently raised to cause undue production of fumes, continuing the delivery of energy after the charge is fused to raise it to pouring temperature and condensing the fumes given off and returning the metallic constituents to the charge.

7. The process of melting in an electric furnace employing an electrode or electrodes metals of high thermal conductivity, consisting in delivering electrical energy to the charge across a zone of resistance between electrode and charge and controlling the resistance so that the rate of delivery of energy during the fusing will be such that the heat developed at or near the electrode or electrodes will be conducted away through the charge before the temperature is sufficiently raised to cause undue production of fumes.

8. The process of melting in an electric furnace employing an electrode or electrodes metals of high thermal conductivity consisting in delivering electrical energy to the charge across a zone of resistance between electrode and charge and controlling the resistance so that the rate of delivery of energy during fusing will be such that the heat developed at or near the electrodes will be conducted away through the charge before the temperature is sufficiently raised to cause undue production of fumes, and continuing the delivery of energy after the charge is fused to raise it to a pouring temperature, and condensing the fumes given off and returning the metallic constituents to the charge.

9. The process of melting in an electric furnace employing an electrode or electrodes metals of high thermal conductivity, consisting in delivering a current of high amperage and low voltage through the electrode or electrodes to the charge and so controlling the rate of delivery of the energy that during fusing the heat developed at or near the electrode or electrodes will be conducted away through the charge before the temperature is sufficiently raised to cause undue production of fumes.

10. The process of melting in an electric furnace employing an electrode or electrodes metals of high thermal conductivity, consisting in delivering a current of high amperage and low voltage through the electrode or electrodes to the charge and so controlling the rate of delivery of energy that during fusing the heat developed at or near the electrode or electrodes will be conducted away through the charge before the temperature is sufficiently raised to cause undue production of fumes, continuing the delivery of energy after the charge is fused to raise it to a pouring temperature and condensing the fumes given off and returning the metallic constituents to the charge.

11. The process of melting in an electric furnace employing an electrode or electrodes metals of high thermal conductivity, consisting in delivering a current of high amperage and low voltage across a zone of resistance between electrode and charge and so controlling the rate of delivery of energy that during fusing the heat developed at or near the electrode or electrodes will be conducted away through the charge before the temperature is sufficiently raised to cause undue production of fumes.

12. The process of melting in an electric furnace employing an electrode or electrodes metals of high thermal conductivity, consisting in delivering a current of high amperage and low voltage across a zone of resistance between electrode and charge and so controlling the delivery of the current that during fusing the heat developed at or near the electrode or electrodes will be conducted away through the charge before the temperature is sufficiently raised to cause undue production of fumes, continuing the delivery of energy after the charge is fused to raise it to a pouring temperature and condensing the fumes given off and returning the metallic constituents to the charge.

13. The process of melting in an electric furnace employing an electrode or electrodes metals of high thermal conductivity, consisting in delivering a current of high amperage and low voltage across a zone of resistance between electrode and charge, and controlling the resistance so that the current delivery during fusing will be such that the heat developed at or near the electrode or electrodes will be conducted away through the charge before the temperature is sufficiently raised to cause undue production of fumes.

14. The process of melting in an electric furnace employing an electrode or electrodes metals of high thermal conductivity consisting in delivering a current of high amperage and low voltage across a zone of resistance between electrode and charge, and controlling the resistance so that the current delivery during fusing will be such that the heat developed at or near the electrode or electrodes will be conducted away through the charge before the temperature is sufficiently raised to cause undue production of fumes, continuing the delivery of energy after the charge is fused to raise it to pouring temperature, and condensing the fumes given off and returning the metallic constituents to the charge.

15. The process of melting and reducing in a furnace having a closed chamber metals having high thermal conductivity, which consists in delivering the heat to the charge at a rate which will effect the melting without producing excessive pressure in the chamber, maintaining a favorable reducing atmosphere in the chamber during the melting operation, and condensing the fumes and returning the metallic constituents to the charge.

16. The process of melting and reducing in a furnace having a closed chamber metals having a high thermal conductivity which consists in delivering electrical energy to the charge at such a rate that the heat produced will effect the melting without producing excessive pressure in the chamber, maintaining a favorable reducing atmosphere in the chamber during the melting operation, and condensing the fumes and returning the metallic constitutents to the charge.

17. The process of melting and reducing in a furnace having a closed chamber, metals having high thermal conductivity which consists in delivering electrical energy to the charge through an electrode or electrodes of carbonaceous material, whereby a favorable reducing atmosphere is maintained in the chamber during melting, the energy being delivered at such a rate that the resultant heat will effect the melting without producing excessive pressure in the chamber, and condensing the fumes and returning the metallic constituents to the charge.

18. The process of melting and reducing in a furnace having a closed chamber, metals having high thermal conductivity which consists in delivering through an electrode or electrodes of carbonaceous material a current of high amperage and low voltage, whereby a favorable reducing atmosphere is maintained in the chamber during the melting, so controlling the current delivered to the charge as to effect the melting without producing excessive pressure in the chamber, and condensing the fumes and returning the metallic constituents to the charge.

19. The process of melting and reducing in a furnace having a closed chamber metals having high thermal conductivity, consisting in delivering through an electrode or electrodes of carbonaceous material a current of high amperage and low voltage across a zone of resistance between electrode and charge, controlling the resistance so that the heat delivered will effect the melting without producing excessive pressure in the chamber, and condensing the fumes and returning the metallic constituents to the charge.

20. The process of melting and reducing metals of high thermal conductivity consisting in subjecting the metal in a closed furnace chamber to heat electrically derived, maintaining a comparatively low temperature in the chamber during the heating and also maintaining a favorable reducing atmosphere therein, whereby the fumes developed are condensed and the metallic constituents saved.

21. The process of melting and reducing metals of high thermal conductivity consisting in subjecting the metal in a closed furnace chamber to a current of high amperage and low voltage transmitted through electrodes of carbonaceous material, the electrodes being so positioned with respect to the charge as to prevent any substantial radiation of heat therefrom into the chamber, whereby a favorable reducing atmosphere is maintained in the chamber and the fumes developed are condensed and the metallic constituents saved.

22. The process of melting and reducing metals of high thermal conductivity consisting in delivering to the charge in the furnace by means of a plurality of electrodes electrical energy of high amperage and low voltage, across a zone of resistance between electrodes and charge, so regulating the delivery as to cause substantially equal amounts of energy to be delivered by each electrode, and so controlling the delivery as to avoid such elevation of temperature of the metal beneath and immediately around the electrodes as will cause an undue production of fumes during the fusing period.

23. The process of melting in an electric furnace metals having high thermal conductivity consisting in delivering to the charge in the furnace by means of a plurality of electrodes electrical energy of high amperage and low voltage, across a zone of resistance between the electrodes and the charge, so regulating the delivery as to cause substantially equal amounts of energy to be delivered by each electrode and so controlling the delivery as to avoid such elevation of temperature of the metal beneath and immediately around the electrode as will cause an undue production of fumes during the fusing period, the delivery of energy being continued after fusing to raise the metal to pouring temperature, the fumes given off being condensed and the metallic constituents thereof returned to the bath.

24. The process of melting in an electric furnace non-ferrous metals having high thermal conductivity consisting in so delivering electrical energy to the charge through a plurality of electrodes as to set up a rotating magnetic field in the fusing metal whereby circulation of said metal is obtained, and so regulating the delivery of energy that the heat developed at the ends of the electrodes will be carried away by the charge before the metal at or near the electrode ends is sufficiently raised in temperature to cause an undue production of fumes.

25. The process of melting in an electric furnace non-ferrous metals having high thermal conductivity, consisting in so delivering a current of high amperage to the charge through a plurality of electrodes as to set up a rotating magnetic field in the fusing metal, whereby circulation of said metal is obtained, and so regulating the delivery of energy that the heat developed at the ends of the electrodes will be carried away by the charge before the metal at or near the electrode ends is sufficiently raised in temperature to cause an undue production of fumes.

26. The process of melting in an electric furnace non-ferrous metals having high thermal conductivity consisting in so delivering an electric current of high amperage to the charge through a plurality of electrodes as to set up a magnetic field in the fusing metal and thus obtain circulation of the metal, and so controlling and regulating the current delivery that the total energy transmitted is substantially evenly distributed between the electrodes and that the heat developed at the ends of the electrodes will be carried away by the charge before the metal at or near the electrode ends is sufficiently raised in temperature to cause an undue production of fumes.

27. The process of melting in an electric furnace employing a closed furnace chamber, non-ferrous metals having high thermal conductivity, consisting in so delivering electric energy to the charge through a plurality of electrodes as to set up a rotating magnetic field in the fusing metal whereby circulation of said metal is obtained, so regulating the delivery of energy that the heat developed at the ends of the electrodes during fusing will be carried away by the charge before the metal at or near the electrode ends is sufficiently raised in temperature to cause an undue production of fumes, continuing the delivery of energy until the charge is raised to pouring temperature, and condensing the fumes and returning the metallic constituents to the charge.

28. The process of melting in an electric furnace having a closed furnace chamber, non-ferrous metals having high thermal conductivity, consisting in so delivering a current of high amperage to the charge through a plurality of electrodes as to set up a rotating magnetic field in the fusing metal, whereby circulation of said metal is obtained, and so regulating the delivery of energy that the heat developed at the end of the electrodes during fusing will be carried away by the charge before the metal at or near the electrode ends is sufficiently raised in temperature to cause an undue production of fumes.

29. The process of melting in an electric furnace having a closed furnace chamber, non-ferrous metals having high thermal conductivity, consisting in so delivering an electric current of high amperage to the charge through a plurality of electrodes as to set up a magnetic field in the fusing metal whereby circulation of said metal is obtained, so controlling and regulating the current delivery that the total energy transmitted is substantially evenly distributed between the electrodes and that the heat developed at the ends of the electrodes during fusing will be carried away by the charge before the metal at or near the electrode ends is sufficiently raised in temperature to cause an undue production of fumes, continuing the delivery of energy until the charge is raised to pouring temperature, and condensing the fumes and returning the metallic constituents to the charge.

In testimony whereof, I have hereunto set my hand.

MORRIS H. BENNETT.